United States Patent
Blizniak et al.

(10) Patent No.: US 7,475,145 B2
(45) Date of Patent: Jan. 6, 2009

(54) DYNAMIC INVOCATION OF WEB SERVICES

(75) Inventors: Paul K. Blizniak, Garner, NC (US); Bryan A. Hogan, Cary, NC (US); Mark D. Weitzel, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1403 days.

(21) Appl. No.: 10/134,078

(22) Filed: Apr. 26, 2002

(65) Prior Publication Data

US 2003/0204622 A1 Oct. 30, 2003

(51) Int. Cl.
*G06F 15/16* (2006.01)
(52) U.S. Cl. .................. 709/227; 709/241; 719/330
(58) Field of Classification Search ............. 709/219, 709/227, 224, 241; 719/330
See application file for complete search history.

(56) References Cited

U.S. PATENT DOCUMENTS

| | | | | |
|---|---|---|---|---|
| 6,052,730 | A | 4/2000 | Felciano et al. | 709/225 |
| 6,061,349 | A | 5/2000 | Coile et al. | 370/389 |
| 6,128,298 | A | 10/2000 | Wootton et al. | 370/392 |
| 6,182,136 | B1 | 1/2001 | Ramanathan et al. | 709/224 |
| 6,182,146 | B1 | 1/2001 | Graham-Cumming, Jr. | 709/238 |
| 6,185,701 | B1 | 2/2001 | Marullo et al. | 714/38 |
| 6,212,560 | B1 | 4/2001 | Fairchild | 709/223 |
| 6,243,380 | B1 | 6/2001 | Malkin | 370/392 |
| 6,243,451 | B1 | 6/2001 | Shah et al. | 379/201 |
| 6,263,370 | B1 | 7/2001 | Kirchner et al. | 709/230 |
| 2001/0005831 | A1 | 6/2001 | Lewin et al. | 705/5 |

(Continued)

FOREIGN PATENT DOCUMENTS

WO WO01/15462 3/2001

OTHER PUBLICATIONS

DAML-S: Semantic Markup For Web Services, A. Ankolekar, M. Burstein, J.R. Hobbs, O. Lassila, D.L. Martin, S.A. McIlraith, S. Narayanan, M. Paolucci, T. Payne, K. Sycara, and H. Zeng, Proceedings of the International Semantic Web Workshop, 2001.*

(Continued)

*Primary Examiner*—Glenton B. Burgess
*Assistant Examiner*—Philip S. Scuderi
(74) *Attorney, Agent, or Firm*—Gregory M. Doudikoff, Esq.; Steven M. Greenberg, Esq.; Carey Rodriguez Greenberg & Paul LLP

(57) ABSTRACT

A method for dynamically invoking a Web service. The method can include assembling a collection of references to remote implementations of the Web service based upon a common port type. One or more ports bound to the remote implementations of the Web service can be identified, and a set of port selection rules can be applied to the identified ports to select a particular one of the ports. Finally, the Web service can be invoked through the selected port. Notably, the identifying step can include parsing a Web service implementation document for each referenced remote implementation in the collection. The parsing can produce a list of ports through which the remote implementations can be invoked. Also, the method can further include compiling the set of port selection rules according to at least one of high-availability concerns, quality of service concerns and economic concerns.

10 Claims, 3 Drawing Sheets

U.S. PATENT DOCUMENTS

| | | | | |
|---|---|---|---|---|
| 2001/0010053 | A1 | 7/2001 | Ben-Shachar et al. | 709/105 |
| 2002/0143819 | A1* | 10/2002 | Han et al. | 707/513 |
| 2003/0004746 | A1* | 1/2003 | Kheirolomoom et al. | 705/1 |
| 2003/0133554 | A1* | 7/2003 | Nykanen et al. | 379/201.01 |
| 2004/0054690 | A1* | 3/2004 | Hillerbrand et al. | 707/104.1 |

OTHER PUBLICATIONS

Semantic Web Services, S McIlraith, TC Son, H Zeng—IEEE Intelligent Systems, 2001—ieeexplore.ieee.org.*

Semantic Matching of Web Services Capabilities, Massimo Paolucci, Takahiro Kawamura, Terry R. Payne, Katia Sycara, Lecture Notes in Computer Science, vol. 2342, Jan. 2002.*

Method of Enabling Automated Invocation of Web Services, IBM technical Disclosure Bulletin, Mar. 2002, UK.*

Understanding WSDL in a UDDI registry, Brittenham et al., Sep. 1, 2001.*

Erik Christensen, et al., *Web Service Definition Language (WSDL) 1.1*, <http://www.w3.org/TR/2001/NOTE-wsdl-20010315>, (Apr. 9, 2002).

Uche Ogbuji, Using WSDL in Soap Applications, An Introduction to WSDL for Soap Programmers, *IBM: DeveloperWorks: Web Services Library*, (Nov. 2000).

Yasser Shohoud, *Understanding SML Namespaces*, <http://www.learnxmlws.com/tutors/xmlns/xmlnsprint.aspx>, DevXpert Corp., (© 2000-2001).

Yasser Shohoud, *XSD Schemas for Visual Basic Developers*, http://www.learnxmlws.com/tutors/xsd/xsdvbPrint.aspx>, DevXpert Corp., (© 2000-2001).

Yasser Shohoud, *Introduction to WSDL*, <http://www.learnxmlws.com/tutors/wsdl/wsdlprint.aspx>, DevXpert Corp., (© 2000-2001).

Vijay Machiraju, et al., A Peer-to-Peer Service Interface For Manageability, *Position Papers for World Wide Web Consortium (W3C) Workshop on Web Services*, Hewlett-Packard Lab, E-Service Software Res. Dept., (2001).

Anders Sandholm, et al., A Type System for Dynamic Web Documents, *Conference Record of POPL '00: 27th ACM SIGPLAN-SIGACT. Symposium on Principles of Programming Languages 2000*, ACM, pp. 290-301, (2000).

O. Ito, et al., Web.Integration Services, *Fujitsu*, Vo. 52, No. 1, pp. 1-4, (2001).

I. Ben-Shaul, et al., Adding Support for Dynamic and Focused Search with Fetuccino, *Computer Networks Conference Title: Comput. Netw.* (Netherlands), vol. 31, No. 11-16, pp. 1653-1665, (May 17, 1999).

L. Monson, The WIDL Specification, *Dr. Dobb's Journal*, vol. 23, No. 11, pp. 92, 94-96, (Nov. 1998).

* cited by examiner

DYNAMIC INVOCATION OF WEB SERVICES

BACKGROUND OF THE INVENTION

1. Statement of the Technical Field

The present invention relates to Web Services and more particularly to the dynamic invocation of Web Services.

2. Description of the Related Art

Web services have become the rage of distributed computing and are viewed as the foundation for developing a truly universal model for supporting the rapid-development of component-based applications over the World Wide Web. Typically, Web services can be defined by an interface and implemented according to the interface, though the implementation details matter little so long as the implementation conforms to the Web services interface. Once a Web service has been implemented according to a corresponding interface, the implementation can be registered with a Web services registry, such as Universal Description, Discover and Integration (UDDI), as is well known in the art.

The Web Services Definition Language (WSDL) is an XML-based language used to define the Web services interface and to describe how to access defined Web services. In a WSDL document, both input and output messages associated with the Web service can be specified. Specifically, the input message can define parameters expected by a service operation and the name of the operation to be invoked. Conversely, the output message can define the result to be returned by the operation, if any. Each of the input and corresponding output messages of the Web service can be specified within an <operation> element in the WSDL document. Moreover, the physical representation of each of the expected parameters and result can be bound to the parameters and result through the <binding> element, as is well-known in the art.

As noted in Erik Christensen, Francisco Curbera, Greg Meredith and Sanjiva Weerawarana, Web Services Description Language (WSDL) 1.1, World Wide Web Consortium (W3C) Note (Mar. 15, 2001), each Web service implementation defined in a WSDL document can be defined using a <port> element. Using the <port> element, different ports can be specified through which a Web service operation can be accessed. For example, the port can specify a service address such as http://localhost/ibm/wsdl/myService.aspx.

In that case, where the service can be invoked through the Simple Object Access Protocol (SOAP), the port definition within the service element can include:

```
<port name='myServicePort' binding='wsdlns:myServiceSoapBinding'>
    <soap:address location = 'http://localhost/ibm/wsdl/myService.asp'/>
</port>
```

By comparison, where the service can be invoked through HTTP, the port definition within the service element can include:

```
<port name='myServicePort' binding=
'wsdlns:myServiceHTTPBinding'>
    <http:address location = 'http://localhost/ibm/wsdl/myService.asp' />
</port>
```

Each Web service can be accessed through multiple different ports. For instance, Web services can be exposed through one port for SOAP invocations, through a second port for HTTP invocations, and through yet a third port for SMTP invocations. To differentiate between each port, however, each specified port must have a unique name and a binding attribute. In any case, for SOAP invocable Web services, the port element can specify a <soap:address/> element containing the service address. By comparison, for HTTP invocable Web services, the port element can specify a <http:address/> element. Still, as it will be recognized by those skilled in the art, Web services need not be exposed exclusively through SOAP, HTTP or SMTP. Rather, other remote procedure calling protocols can suffice, as is well-known in the art.

SUMMARY OF THE INVENTION

The present invention overcomes the limitations of conventional methods for invoking Web services and provides a novel and non-obvious method and system for dynamically invoking a Web service according to a set of port selection rules. In one aspect of the invention, a system for dynamically invoking a Web service according to a set of port selection rules can be provided. In particular, the system can include a set of port selection rules for selecting one of a set of ports through which a remote instance of a Web service can be invoked.

The system also can include a Web services container configured to service requests for Web services by invoking remote instances of the requested Web services. Finally, the system can include a port resolution processor disposed within the Web services container. The port resolution processor can dynamically select, according to the port selection rules, an individual port from among the set of ports through which the remote Web service can be invoked.

Notably, the system can further include at least one Web service implementation document specifying the set of ports. Specifically, the Web service implementation document can conform to WSDL. Likewise, the system can further include a Web service schema specifying both a port type for the Web service and a binding between the port type and a particular transport protocol. Finally, the Web service container further can include a Web service discovery processor able to query a remote registry of Web services to identify sets of Web service implementations which can satisfy the requests.

A method for dynamically invoking a Web service can include assembling a collection of references to remote implementations of the Web service based upon a common port type. One or more ports bound to the remote implementations of the Web service can be identified, and a set of port selection rules can be applied to the identified ports to select a particular one of the ports. Finally, the Web service can be invoked through the selected port.

Notably, the identifying step can include parsing a Web service implementation document for each referenced remote implementation in the collection. The parsing can produce a list of ports through which the remote implementations can be invoked. In addition, the list of ports may be assembled from information retrieved from a Web service registry, e.g. UDDI. Also, the method can further include compiling the set of port selection rules according to at least one of high-availability concerns, quality of service concerns and economic concerns.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a system and method for dynamically invoking Web services according to a set of service and port selection rules. In accordance with the present invention, multiple Web services implementation can specify one or more ports, each port having a binding to a particular port address and port type. Upon request, a subset of Web services implementations can be identified, each in the subset corresponding to a particular preferred port type. A set of rules for selecting Web services for invocation can be applied to the subset and individual Web services in the subset can be invoked. These rules are an extensible set and may be based upon introspection of the port. In this way, Web services can be dynamically selected according to requirements reflected within the set of rules. For instance, the requirements can address fail-over concerns, business-related prioritization concerns, quality of service concerns, and the like.

Figure 1:
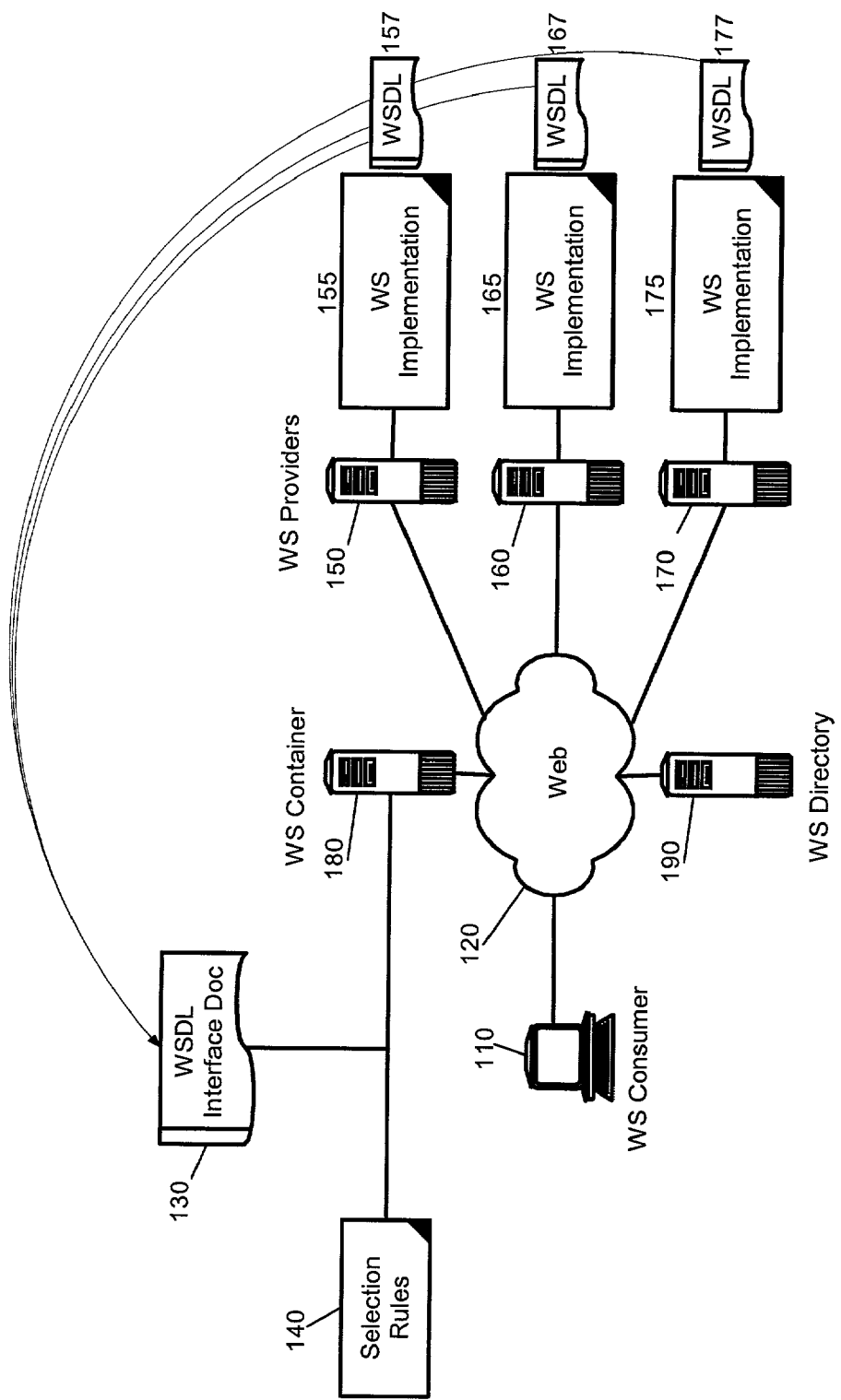
FIG. 1 is a schematic illustration of a system for dynamically invoking Web services in a Web services container; and, FIG. 2 is a flow chart illustrating a process for dynamically invoking a Web service in the Web services container of FIG. 1.
Figure 1A:
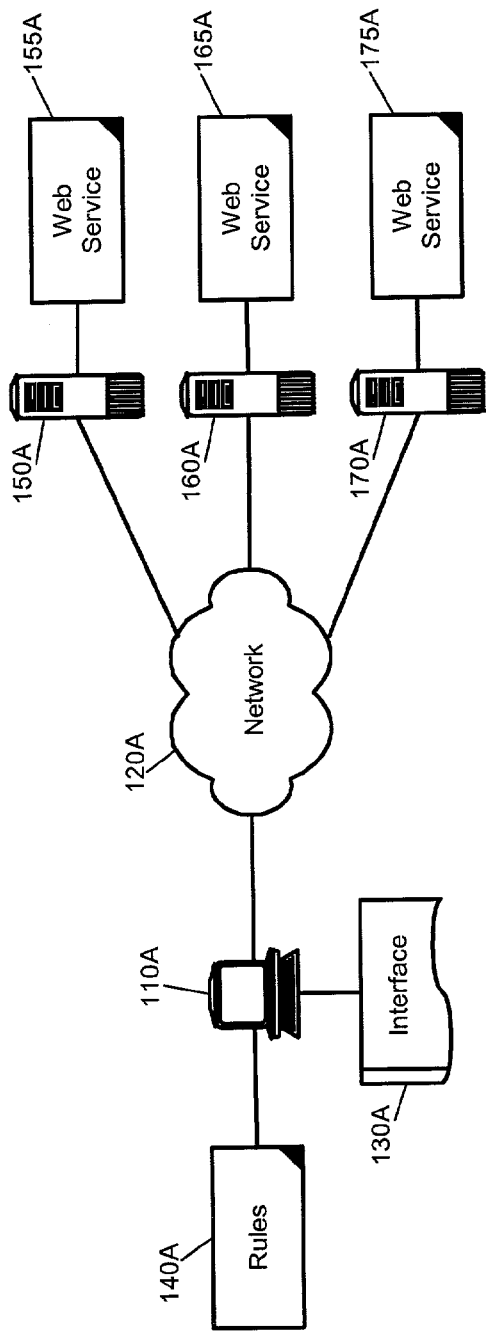
Figure 1B:
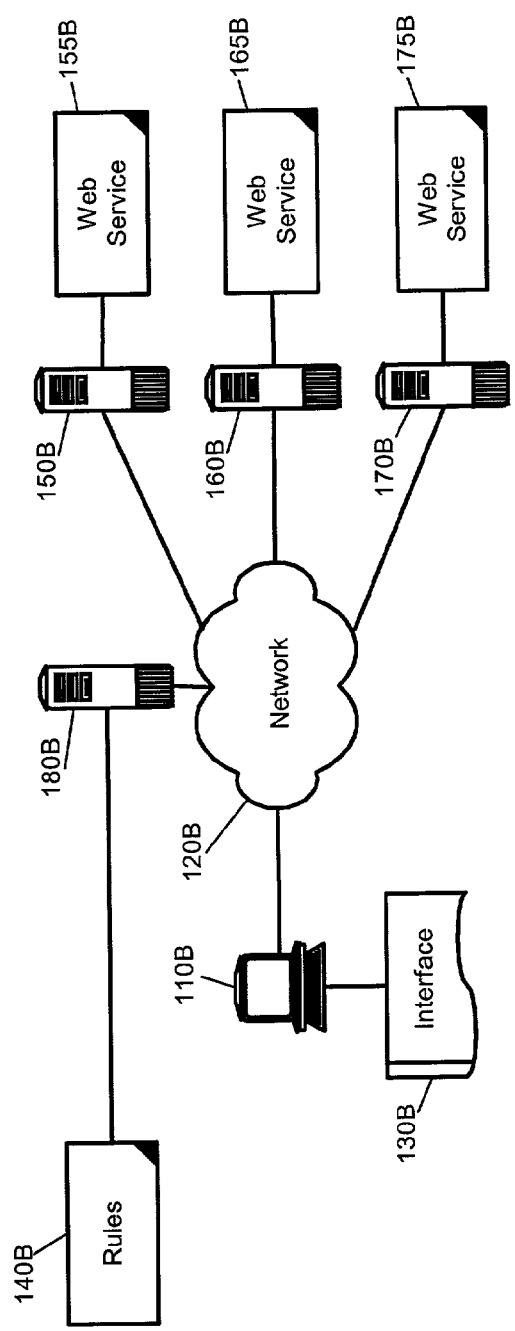

FIG. 1 is a schematic illustration of a system for dynamically invoking Web services according to a set of port selection rules. As will be apparent from the figure, the system can include one or more Web services providers 150, 160, 170, each hosting one or more Web service implementations 155, 165, 175. Web service consuming clients 110 (only one illustrated) can access the individual Web services implementations 155, 165, 175 through a Web services container 180 over a data communications network 120, for instance the Internet. In that regard, the Web services container 180 can be a client, server or client-server construct for facilitating the hosting and invocation of Web services. Alternatively, the Web services container 180 can be an engine for hosting and invoking Web services.

Importantly, each Web service implementation 155, 165, 175, can conform to a Web service implementation document 157, 167, 177 such as a Web services implementation WSDL document. Moreover, each implementation document 157, 167, 177 can reference a Web services interface document 130. Like the Web services implementation 157, 167, 177, the Web services interface, too, can be a WSDL document. Thus, each Web services implementation document 157, 167, 177 and the Web services interface 130 collectively can provide a Web service definition for corresponding Web services.

Still as one skilled in the art will recognize, not all Web services require corresponding Web services implementations. Rather, it is well-known that Web services registries, such as UDDI, can provide the pertinent implementation information which otherwise would be provided by a Web services implementation, in lieu of the Web services implementation. Also, it is to be understood, that the collective Web service definition can be logically, rather than physically, partitioned among the Web services implementation document 157, 167, 177 and the Web services interface document 130. Specifically, each of the Web services implementation document 157, 167, 177 and the Web services interface document 130, can in and of themselves, be partitioned across multiple physical documents.

In accordance with the present invention, consuming clients 110 can request access to a Web service. Specifically, the Web services container 180 can receive the request and can query a Web services directory 190 to locate Web services implementations which conform to the interface of the requested Web service. As will be recognized by one skilled in the art, the Web services container 180 can query the Web services directory 190 according to UDDI. More particularly, the Web services container 180 can identify one or more preferred communications protocols through which the consuming client 110 can receive Web services, for example SOAP over HTTP, SOAP over SMTP, SOAP over JMS, etc. Subsequently, the Web services container 180 can request from the Web services directory 190 only those Web services implementations 155, 165, 175 which can be accessed according to the preferred communications protocols.

In that regard, the Web services container 180 can assemble a subset of those Web service implementations, such as the Web service implementations 155, 165, 175, which implement the requested Web service, the subset containing only those Web services which can be accessed according to a preferred WSDL-defined port and binding. As will be recognized by one skilled in the art, a WSDL-defined binding can specify the protocol and transport with which a Web service can be accessed.

Once the subset has been assembled, the Web services container 180 can interpret the Web service implementation information 157, 167, 177, in the subset to identify the ports through which the Web service 155, 165, 175, can be accessed. Specifically, the Web service interface 130 is referenced by each Web service provider 150, 160, 170, through their implementation 155, 165, 175. Each implementation can include one or more ports specifying the manner in which they may be accessed.

A set of port selection rules 140 can be provided for defining a methodology for selectively invoking individual ones of the Web services implementations 155, 165, 175 in the subset. For example, the port selection rules 140 can address fail-over concerns and, in that regard, can specify an ordered list of ports through which the Web services implementations 155, 165, 175 can be accessed. In this way, where the Web services container 180 is unable to invoke a particular Web service implementation through a preferred port, a fail-over port can be used to invoke the particular Web service implementation in lieu of the preferred port. Still, the invention is not limited merely to port selection rules which address fail-over concerns and other concerns can form the basis of the port selection rules, including economic concerns such as selecting the most cost-effective Web services implementation, or quality of service concerns such as the Web services implementation most likely to respond most quickly.

Figure 2:
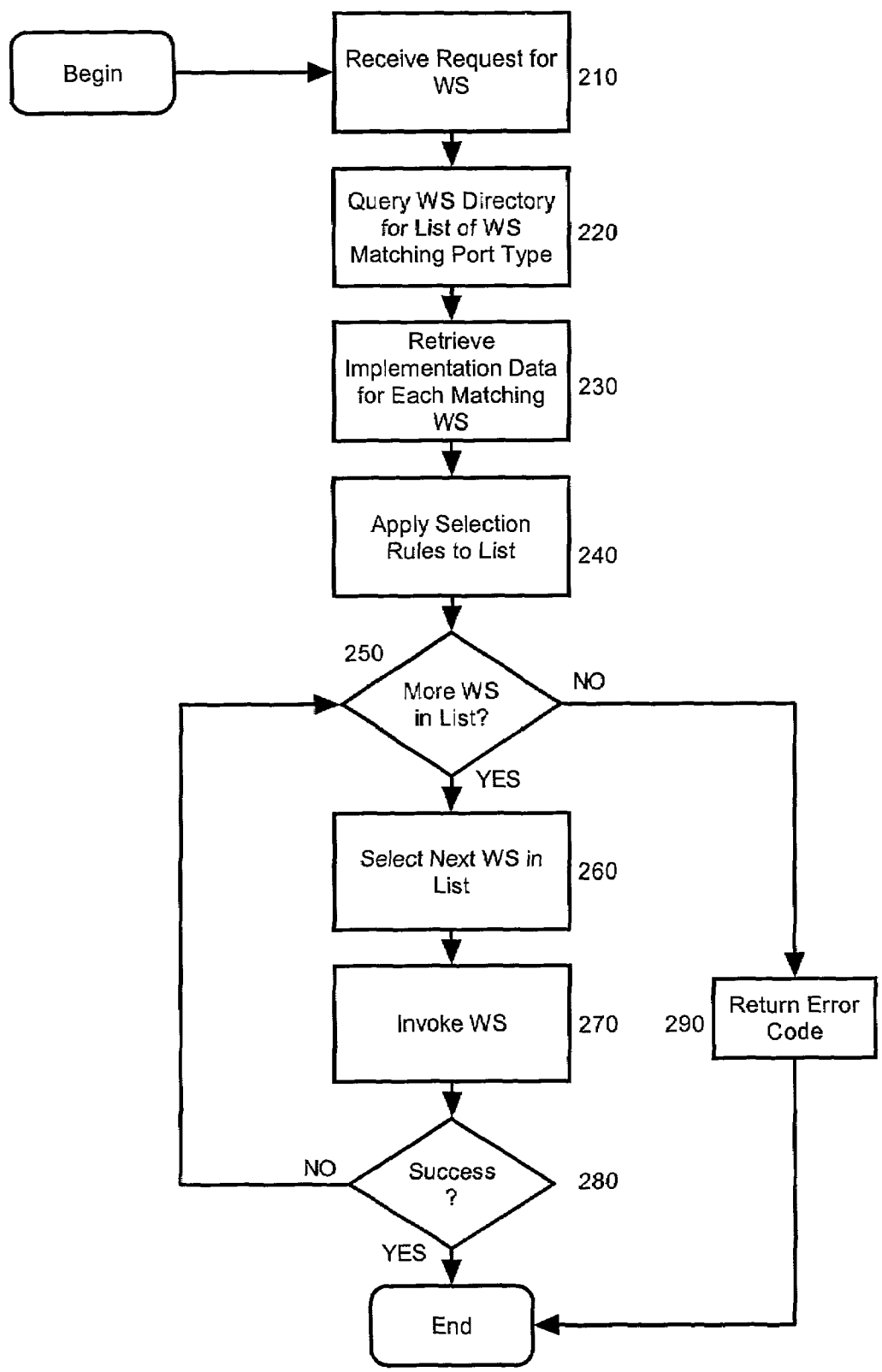

FIG. 2 is a flow chart illustrating a process for dynamically invoking a requested Web service according to a set of port selection rules. Notably, a logical process within the Web services container 180 of FIG. 1 can perform the process of FIG. 2. In particular, the method of FIG. 2 can be implemented in a pluggable process disposed within or associated with the Web services container 180 of FIG. 1. Beginning in block 210, a request for a Web service can be received in the Web services container. In block 220, a Web services registry can be queried to identify one or more implementations of the requested Web service. Moreover, the Web services directory can be particularly queried to identify only those implementations of the requested Web service which can be accessed according to a particular port type preferred by the requestor.

In block 230, Web services implementation data can be retrieved for each identified Web service in the collection. In particular, the Web services interface can conform to WDSL and, in that regard, a set of available ports can be identified for each Web service implementation in the collection. In block 240, a set of port selection rules can be applied to the collection of Web services implementations to determine which Web service implementation in the collection to first invoke. Importantly, the application of the port selection process rules can provide a platform for implementing multiple user extensible Web service selection strategies. For example, a particular Web service can be preferred, regardless of the underlying transport, for instance SOAP/HTTP, SOAP/JMS, HTTP/

GET-POST, and the like. As another example, a particular transport can be preferred regardless of the selected Web service. For example, SOAP/HTTP can be preferred and only those Web services which can be provided using the preferred transport can be invoked. Still, the invention is not limited to any particular selection strategy. Rather, other criteria can be applied to the port selection rules, such as whether a selected Web service supports particular security standards, pre-negotiated business arrangements, etc.

If the set of port selection rules resolves to a particular Web service implementation in block 250, in blocks 260 and 270, the resolved Web service implementation can be invoked. Notably, if in block 280 the invocation fails, for example due to the unavailability of a Web services provider hosting the resolved Web service implementation, the process can repeat in blocks 250 through 280. If no Web services remain to be invoked, however, in block 250, in block 290 an error code can be returned and the process can end. In any case, as it will be apparent to one skilled in the art, though multiple sources of multiple implementations of a requested Web service can be invoked, different selection logic can be applied to resolve a particular Web service implementation for invocation. Though the selection logic can vary, typical selection logic can relate to high-availability and fail-over concerns, economic concerns, and the like.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A system for dynamically invoking an operation in a remote instance of a Web service, the system comprising:
   a set of port selection rules for selecting one of a set of ports through which a remote instance of a Web service can be invoked;
   a Web services container configured to service requests for Web services by invoking remote instances of said requested Web services;
   a port resolution processor disposed within said Web services container, said port resolution processor having a configuration for dynamically selecting, according to said port selection rules, an individual port from among said set of ports through which said Web services container can invoke said remote instances of said requested Web services; and
   a Web service discovery processor able to query a remote registry of Web services to identify sets of Web service implementations accessible by a preferred communication protocol.

2. The system of claim 1, further comprising at least one Web service implementation document specifying said set of ports.

3. The system of claim 2, further comprising a Web service schema specifying both a port type for said Web service and a binding between said port type and a particular transport protocol.

4. The system of claim 2, wherein said Web service implementation document conforms to the Web Services Description Language (WSDL).

5. A method for dynamically invoking a Web service comprising the steps of:
   assembling a collection of references to remote implementations of the Web service based upon a common port type;
   identifying a plurality of ports bound to said remote implementations of the Web service; applying a set of port selection rules to said identified ports to select a particular one of said ports; and,
   invoking the Web service through said selected port.

6. The method of claim 5, wherein said identifying step comprises the step of parsing a Web service implementation document for each referenced remote implementation in said collection, said parsing producing a list of ports through which said remote implementations can be invoked.

7. The method of claim 5, further comprising the step of compiling said set of port selection rules according to at least one of high-availability concerns, quality of service concerns and economic concerns.

8. A machine readable storage having stored thereon a computer program for performing dynamic port selection, said computer program comprising a routing set of instructions for causing the machine to perform the steps of:
   assembling a collection of references to remote implementations of the Web service based upon a common port type;
   identifying a plurality of ports bound to said remote implementations of the Web service;
   applying a set of port selection rules to said identified ports to select a particular one of said ports; and,
   invoking the Web service through said selected port.

9. The machine readable storage of claim 8, wherein said identifying step comprises the step of parsing a Web service implementation document for each referenced remote implementation in said collection, said parsing producing a list of ports through which said remote implementations can be invoked.

10. The machine readable storage of claim 8, further comprising the step of compiling said set of port selection rules according to at least one of high-availability concerns, quality of service concerns and economic concerns.

* * * * *

UNITED STATES PATENT AND TRADEMARK OFFICE
CERTIFICATE OF CORRECTION

| | | |
|---|---|---|
| PATENT NO. | : 7,475,145 B2 | Page 1 of 1 |
| APPLICATION NO. | : 10/134078 | |
| DATED | : January 6, 2009 | |
| INVENTOR(S) | : Blizniak | |

It is certified that error appears in the above-identified patent and that said Letters Patent is hereby corrected as shown below:

In the Claims

Col. 6, line 41 "a routing set of instructions" should read --a routine set of instructions--.

Signed and Sealed this

Eleventh Day of January, 2011

David J. Kappos
*Director of the United States Patent and Trademark Office*